July 29, 1924.
J. E. BEARD
AUTOMOBILE BRAKE
Filed June 11, 1923      2 Sheets-Sheet 1
1,503,412
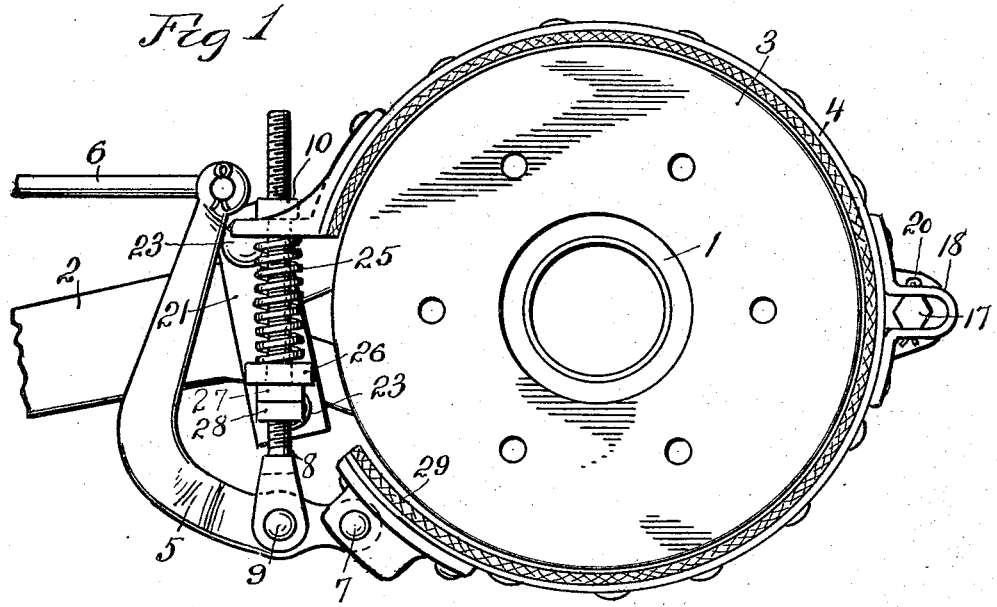
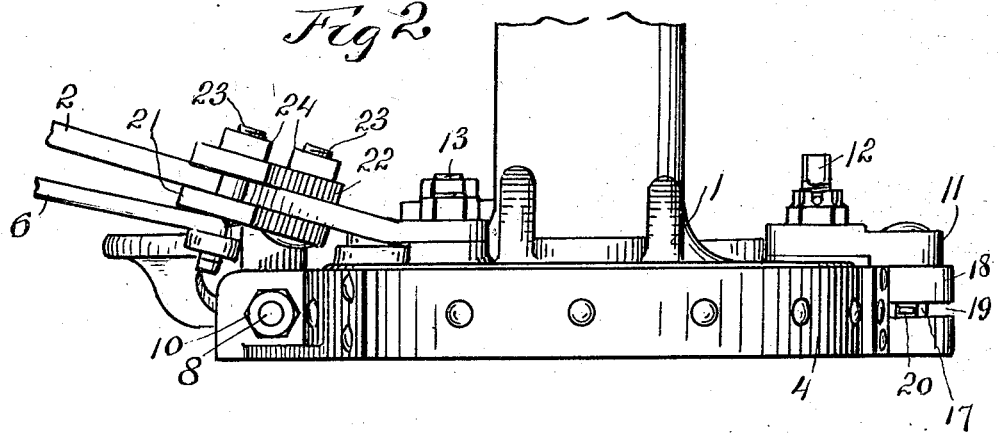
Witness:
R. E. Hamilton
INVENTOR.
John E. Beard
BY
Warren D. House
His ATTORNEY.

July 29, 1924. 1,503,412
J. E. BEARD
AUTOMOBILE BRAKE
Filed June 11, 1923 2 Sheets-Sheet 2

INVENTOR.
John E. Beard
BY
Warren D. House
His ATTORNEY.

Witness:
R. E. Hamilton

Patented July 29, 1924.

1,503,412

UNITED STATES PATENT OFFICE.

JOHN E. BEARD, OF KANSAS CITY, MISSOURI.

AUTOMOBILE BRAKE.

Application filed June 11, 1923. Serial No. 644,582.

*To all whom it may concern:*

Be it known that I, JOHN E. BEARD, a citizen of the United States, residing at Kansas City, in the county of Jackson and State of Missouri, have invented a certain new and useful Improvement in Automobile Brakes, of which the following is a specification.

My invention relates to improvements in automobile brakes.

The object of my invention is to provide a brake of the kind described which is simple, cheap, strong and durable, not liable to get out of order, which can be quickly and easily adjusted to compensate for wear, which will afford uniform pressure on the drum of the contacting surface of the brake band thereon, which is not liable to cramp, and which is efficient in operation.

Still another object of my invention is to provide a structure which will hold the brake band from sidewise tipping with respect to the drum.

The novel features of my invention are hereinafter fully described and claimed.

In the accompanying drawings, which illustrate the preferred embodiment of my invention, Fig. 1 is an outside elevation of my improved brake, a portion of a brake drum, axle housing and radius rod.

Fig. 2 is a top view of the same.

Similar reference characters designate similar parts in the different views.

Figure 3:
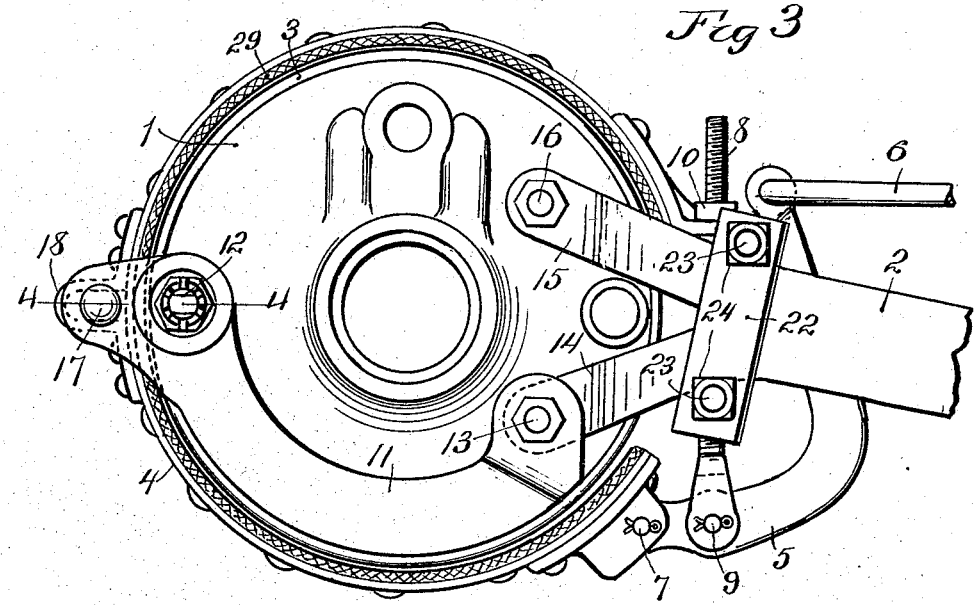
Fig. 3 is an inside elevation of the same.

1 designates the usual axle housing for one of the rear axles of an automobile. 2 designates the adjacent rear radius rod. 3 the adjacent brake drum, 4 the usual brake band which co-operates with the drum 3 and encircles the periphery thereof. 5 designates the ordinary brake lever, to one end of which is attached the usual operating rod 6, the other end of the lever being pivoted by a transverse bolt 7 to the brake band 4 adjacent to one end thereof, the other end portion of the brake band 4 having extending through it and slidable therein the usual vertical screw 8, which is pivoted to the lever 5 adjacent to the lower end of the screw by a transverse bolt 9. A nut 10 is fitted on the screw 8 and bears against the upper side of the brake band 4.

Figure 4:
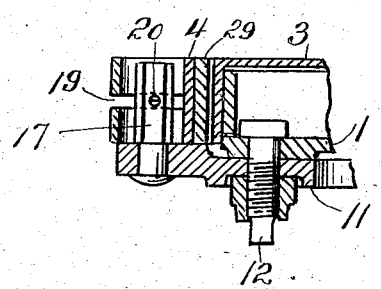
Fig. 4 is a section on the line 4—4 of Fig. 3.

Rigidly attached to the inner side of the axle housing 1 is an arcuate plate 11, Figs. 3 and 4, the attachment being effected by means of two bolts 12 and 13, the latter also serving to fasten one of the arms 14 of the bifurcated rear end of the radius rod 2, the other arm 15 being attached to the housing 1 by a bolt 16.

Rigidly mounted in the rear end of the plate 11 is a transverse stud 17, the upper and lower sides of which are embraced respectively by the upper and lower arms of a U-shaped plate 18, which is rigidly attached to the rear side of the brake band 4. The latter is adjustable forwardly and backwardly on the stud 17, but is held by the latter from sidewise tipping with respect to the drum 3 so as to eliminate liability of the brake band cramping on the drum.

Extending through the stud 17 and through a vertical slot 19 in the plate 18, is a cotter pin 20, Figs. 1 and 4, which holds the brake band 4 from sidewise slipping on the stud 17.

A supporting member 21, Figs. 1 and 2, is adjustably rigidly fastened to the outer side of the radius rod 2, in any suitable manner, the fastening means shown comprising a clamping plate 22, which bears against the inner side of the radius rod 2, and two bolts 23, disposed respectively above and below the radius rod 2, and extending through the supporting member 21, and the clamping plate 22, and which are respectively provided with nuts 24, which bear against the inner side of the clamping plate 22. The heads of the bolts 23 bear against the outer side of the supporting member 21.

Encircling the screw 8 is a coil spring 25, Fig. 1, the upper end of which bears against the under side of the upper end portion of the brake band 4, and the lower end of which bears against an outwardly extending lug 26 on the supporting member 21. The lug 26 is provided with a vertical hole through which extends and which is vertically slidable the screw 8. On the latter is fitted a nut 27, Fig. 1, which bears against the under side of the lug 26, and against which bears a lock nut 28 on the screw 8.

In the adjustment of the brake band with reference to the drum 3, the nuts 24 are loosened, and the supporting member 21 is moved longitudinally on the radius rod 2 to the proper position, the plate 18 sliding on the stud 17, and the brake lever 5 being in the released position, shown in Fig. 1. The nuts 10, 27 and 28 are adjusted to positions in which the brake lining, designated by 29 clears the drum 3 at an approximately uniform distance throughout the length of the brake lining 29, as shown in Figs. 1 and 3.

When the proper adjustment has been made, the nuts 24 are tightened, whereby the supporting member 21 is held firmly in the position to which it has been adjusted.

When the operating rod 6 is pulled forwardly in setting the brake, the brake lever 5 is swung downwardly on the bolt 7, thus drawing downwardly the screw 8 and with it the nut 10, thus forcing the upper portion of the brake band 4 downwardly to the braking position, and compressing the spring 25. The brake lever 5 will swing on the bolt 9, when the screw 8 stops its downward movement, upon which the lower and rear end of the brake lever 5 will move upwardly, thus forcing, by means of the bolt 7 the lower portion of the brake strap 4 to the braking position. Upon releasing the operating rod 6, the spring 25 will force the screw 8 upwardly, by means of the brake band 4 and the nut 10, thereby causing the parts to assume the released position shown in the drawings.

By mounting the supporting member 21 adjustably on the radius rod 2, and by having the bolt 8 guided in the lug 26 of the supporting member 21, a very simple and efficient means is provided for adjustment of the brake band and for reliably holding it in the position to which it is adjusted.

By having the plate 18 slidable on and neatly fitting the stud 17, and by having the latter rigidly mounted in the arcuate plate 11, the brake band 4 is securely held against sidewise tipping and consequent cramping on the brake drum 3.

I do not limit my invention to the structure shown and described, as many modifications, within the scope of the appended claims, may be made without departing from the spirit of my invention.

What I claim is:—

1. In an automobile brake, the combination with an axle housing, a radius rod attached thereto, a brake band support rigidly attached to said axle housing, a brake band adjustable forwards and backwards on said support and held by the latter from sidewise tipping, a brake lever pivoted to said brake band, a screw pivoted to said brake lever and extending through and slidably mounted in the brake band, and a nut mounted on said screw and bearing on said brake band, of a supporting member in which said screw is longitudinally slidably mounted, a spring encircling said screw and having its ends bearing respectively against said brake band and said supporting member, and adjustable means for fastening said supporting member to said radius rod arranged to permit the forward and backward adjustment of said supporting member on said radius rod, substantially as set forth.

2. In an automobile brake, the combination with an axle housing, a radius rod attached thereto, a brake band support rigidly attached to said axle housing, a brake band adjustable forward and backward on said support and held by the latter from sidewise tipping, a brake lever pivoted to said brake band adjacent one end thereof, a screw pivoted to said brake lever and extending through and slidably mounted in said brake band adjacent to the other end thereof, and a nut mounted on said screw and bearing on said last named portion of the brake band, of a supporting member in which said screw is longitudinally slidable, a spring bearing against said supporting member and against the last named portion of said brake band, a clamping member embracing one side of said radius rod, said supporting member bearing against the opposite side of said radius rod, and bolts connecting said clamping member and said supporting member respectively above and below said radius rod, whereby said supporting member may be adjusted forwardly and backwardly and held rigidly clamped to said radius rod, substantially as set forth.

3. In an automobile brake, the combination with a radius rod, an axle housing to which the rod is attached, a brake band adjustable forwardly and backwardly on said housing, a brake lever pivoted to said brake band, a screw pivoted to said lever and longitudinally slidable in said brake band, of a supporting member in which said screw is longitudinally slidable, a nut mounted on said screw and bearing on said brake band, a spring bearing against said brake band and against said supporting member, and adjustable means for fastening said supporting member on said radius rod, whereby the supporting member may be adjusted forwardly and backwardly on said radius rod, substantially as set forth.

In testimony whereof I have signed my name to this specification.

JOHN E. BEARD.